US012201992B2

(12) United States Patent
Mueller

(10) Patent No.: US 12,201,992 B2
(45) Date of Patent: Jan. 21, 2025

(54) APPARATUS FOR HOMOGENIZATION AND SEPARATION OF SUBSTANCE MIXTURES COMPOSED OF PARTICLES

(71) Applicants: Key Machinery GmbH, Sulzberg (DE); Albert Huthmann GmbH & Co KG, Stuttgart (DE)

(72) Inventor: Gert Mueller, Sulzberg (DE)

(73) Assignees: Key Machinery GmbH, Sulzberg (DE); Albert Huthmann GmbH & Co KG, Stuttgart (DE)

( * ) Notice: Subject to any disclaimer, the term of this patent is extended or adjusted under 35 U.S.C. 154(b) by 0 days.

(21) Appl. No.: 15/978,381

(22) Filed: May 14, 2018

(65) Prior Publication Data

US 2018/0333728 A1 Nov. 22, 2018

(30) Foreign Application Priority Data

May 17, 2017 (DE) ..................... 10 2017 110 778.9

(51) Int. Cl.

*B02C 23/14* (2006.01)
*B02C 13/06* (2006.01)
*B02C 13/28* (2006.01)
*B02C 13/286* (2006.01)
*B02C 23/10* (2006.01)
*B07B 13/10* (2006.01)
*B07B 13/16* (2006.01)

(52) U.S. Cl.

CPC .............. *B02C 23/14* (2013.01); *B02C 13/06* (2013.01); *B02C 13/2804* (2013.01); *B02C 13/286* (2013.01); *B02C 23/10* (2013.01); *B07B 13/10* (2013.01); *B07B 13/16* (2013.01); *B02C 2013/28609* (2013.01); *B02C 2013/28636* (2013.01)

(58) Field of Classification Search

CPC B02C 2013/28609; B02C 2013/28636; B02C 13/286; B02C 13/06; B02C 13/2804; B02C 23/14; B02C 13/26; B02C 23/10; B07B 13/116

See application file for complete search history.

(56) References Cited

U.S. PATENT DOCUMENTS 1,705,456 A * 3/1929 Katayama ............. B07B 13/116 209/692
2,010,508 A * 8/1935 Conway .................... B03B 9/06 209/33
2,151,894 A * 3/1939 Cambessedes ........... B03B 9/06 209/31

(Continued)

FOREIGN PATENT DOCUMENTS

KR 20110004090 A * 1/2011 ............. B02C 13/28
WO WO-2015128753 A1 * 9/2015 ............. B07B 13/10

OTHER PUBLICATIONS

CN 106269803A, Yang et al. Jan. 2017.*

*Primary Examiner* — Edward T Tolan
(74) *Attorney, Agent, or Firm* — Collard & Roe, P.C.

(57) ABSTRACT

Apparatus (1) for homogenization and separation of substance mixtures composed of particles, having two or more material discharges, wherein a rotating drum (5) is provided, which comminutes and homogenizes the substance mixture, on the one hand, and accelerates the particles in a predetermined direction.

13 Claims, 3 Drawing Sheets

(56) References Cited

U.S. PATENT DOCUMENTS 3,224,839 A * 12/1965 Pierson .................. B02C 17/22 241/101.5
3,804,249 A * 4/1974 Gibbons .................. B03B 9/06 209/473
3,946,950 A * 3/1976 Graf ........................ B02C 13/04 241/189.1
4,011,999 A * 3/1977 Glaeser ................. B02C 13/286 198/603
4,141,450 A * 2/1979 Clin ...................... B07B 13/003 209/637
4,178,232 A * 12/1979 Nollet ....................... B07B 4/06 241/DIG. 38
4,361,290 A * 11/1982 Francis .................. B02C 13/09 241/186.3
4,848,677 A * 7/1989 Rayner .................. B02C 13/09 241/40
5,181,617 A * 1/1993 Lehrmann ................. B03B 9/06 209/31
5,230,475 A * 7/1993 Gerner .................. B02C 13/286 198/626.3
5,558,281 A * 9/1996 Bouldin .................. B02C 13/04 241/189.1
6,290,153 B1 * 9/2001 Prox ....................... B02C 17/02 241/24.22
9,033,157 B2 * 5/2015 Berkhout ................ B07B 13/10 209/644
2013/0233776 A1 * 9/2013 Berkhout .............. B07B 13/116 209/659
2014/0102955 A1 * 4/2014 Viny ....................... B07B 4/025 209/644
2014/0345497 A1 * 11/2014 Dumont ................ B02C 21/007 106/772
2015/0122920 A1 * 5/2015 Dallimore ............. B02C 13/095 241/24.1
2016/0001296 A1 * 1/2016 Scaife ..................... B02C 23/38 241/24.1
2016/0107168 A1 * 4/2016 Tschantz ................. B02C 23/14 241/81
2016/0138230 A1 * 5/2016 Langtry ................. B05D 5/063 428/426
2017/0259270 A1 * 9/2017 Watkins .................. B02C 13/06
2019/0001340 A1 * 1/2019 Lutoslawski ........... B02C 25/00

* cited by examiner

APPARATUS FOR HOMOGENIZATION AND SEPARATION OF SUBSTANCE MIXTURES COMPOSED OF PARTICLES

CROSS REFERENCE TO RELATED APPLICATIONS

Applicants claim priority under 35 U.S.C. § 119 of German Application No. 10 2017 110 778.9 filed on May 17, 2017, the disclosure of which is incorporated by reference.

BACKGROUND OF THE INVENTION

1. Field of the Invention

The present invention relates to an apparatus for homogenization and separation of substance mixtures composed of particles, having two or more material discharges.

2. Description of the Related Art

Slag, flue ash, shredders, shredder residues, household garbage and commercial garbage, both from shredders and from waste dumps, must be separated into their components as well as possible for recycling.

Only when these starting substance mixtures have been separated into their components can they be recycled.

For this purpose, a plurality of screening and separation methods are known, which can be carried out by means of corresponding apparatuses.

However, these separation methods are very complicated. Specifically in the case of screening methods, a plurality of screens must be used. Baths are often provided for separation in accordance with density.

All of this is complicated and therefore expensive and subject to equipment failure.

Furthermore, sticky substance mixtures are very difficult to separate or cannot be separated at all. The cleaning effort for such systems is substantial.

SUMMARY OF THE INVENTION

It is the task of the invention to propose a simple apparatus that can be operated in reliable manner, and makes it possible to separate substance mixtures composed of particles in accordance with density, and, in this regard, if necessary, to comminute and/or homogenize the incoming substance mixture.

This task is accomplished, according to the invention, in that a rotating drum is provided, which comminutes and homogenizes the substance mixture, on the one hand, and accelerates the particles in a predetermined direction.

The particles that impact the drum are comminuted and homogenized due to the impact, and are subsequently accelerated in a predetermined direction, depending on their impact point, in the direction of rotation of the drum, and slung away. If the particles have approximately the same size, they experience a kinetic energy in accordance with their density, in each instance, which energy determines the flight distance. The particles thereby impact a material discharge at different distances from the drum.

In this regard, it has proven to be very advantageous, according to the invention, if the rotating drum is equipped with striking tools, wherein these striking tools can be connected with the drum in fixed or movable manner.

The particles are accelerated and homogenized in particularly effective manner by these striking tools. Depending on the substance mixture to be processed and the speed of rotation of the drum, these tools can be attached in movable manner, preferably in flying manner, or in rigid manner.

It is also very advantageous, in this connection, if the striking tools are configured to be replaceable.

In this way, different striking tools can be used, and also worn tools can be replaced in simple manner.

Furthermore, it has proven to be very advantageous, according to the invention, if one or more drive motors are provided for the rotating drum, wherein the drive motor can be connected with the drum directly or indirectly.

The drive motor is particularly well protected by means of an indirect drive. If a belt drive is used, it can also absorb impacts. A direct drive is also conceivable, as is a combination of multiple drive motors having the same or different drive concepts.

According to the invention, it has also proven to be very advantageous if the rotating drum is configured so as to be horizontally and/or vertically adjustable.

As a result, the flight parabolas of the impacting particles can be set. In this regard, the position of the drum determines the starting point of the respective flight parabola. In this regard, the adjustment can take place not only by way of a corresponding attachment, but rather also, for example, by way of an adjustment gear mechanism or the like. Adjustment during operation of the apparatus is conceivable, in this regard.

A very advantageous embodiment of the invention is also present if a conveying element, preferably a conveyor belt or a vibrating chute, is provided, which passes the substance mixture to be separated along to the drum.

In this way, the substance mixture can be applied to the drum in precisely targeted manner. Depending on the substance mixture, different conveying elements can be provided.

In this regard, it has also proven to be very advantageous if the conveying element, preferably the conveyor belt, is configured to be adjustable, at least in relation to the drum, with regard to its inclination and/or its end that faces the drum, in the horizontal and/or vertical direction.

In this way, the impact position, the amount, and also the drop height can be adjusted as a function of the substance mixture to be separated. It also becomes possible to separate very sticky substance mixtures, without the non-separated substance mixture becoming stuck somewhere in unwanted manner. The substance mixture that impacts the drum is slung away due to centrifugal forces that occur. In this regard, all of the conveying elements can be configured to be adjustable, wherein it is conceivable that the adjustment can also take place during operation, by means of a corresponding configuration. Specifically the conveying element that holds what is called the light discharge can also be configured to be adjustable.

A further very advantageous embodiment is present if two or more material collection apparatuses are provided, wherein these can be configured to be adjustable with regard to inclination, vertical and/or horizontal position, in each instance.

The corresponding fractions are collected in these collection apparatuses. Optimal adaptation to the substances contained in the substance mixture can take place by means of the adjustment, and thereby the fractions can be cleanly separated.

In this regard, it has proven to be particularly advantageous if the material collection apparatuses are configured as a conveying element, preferably as a conveyor belt or a vibrating chute, wherein these can be configured to be adjustable with regard to inclination, vertical and/or horizontal position, in each instance.

In this way, the fractions are collected reliably and transported away immediately.

It is also very advantageous, in this connection, if at least two conveying elements, preferably conveyor belts or vibrating chutes, are provided, wherein their conveying directions can be oriented to run opposite one another.

Such an arrangement has proven to be particularly effective.

It is also extremely advantageous, according to the invention, if one or more discharge devices for separated particles are provided, wherein for this purpose, conveying elements, preferably conveyor belts or screw conveyors, collection boxes or the like can be provided, wherein these can be configured to be adjustable with regard to inclination, vertical and/or horizontal position, in each instance.

In this way, at least approximately continuous operation of the apparatus can be ensured. Here, too, optimal adaptation and resulting purity of the respective fractions can be ensured, in that the collection devices are positioned accordingly.

According to a further embodiment of the invention, it is also very advantageous if further separation devices follow the separation device having a drum.

As a result, the fractions that are produced at first can be further separated once again.

It is very advantageous, in this connection, if a high-speed conveyor belt is provided, which accelerates particles to be separated.

The particles are separated by means of such acceleration, since a corresponding impulse is applied to each particle.

A further extremely advantageous embodiment of the invention is present if a separation device is provided between two separation stages.

As a result, separation between the separation stages is improved once again.

It is also very advantageous, according to the invention, if a material feed is provided, which can be configured to be regulatable.

As a result, the apparatus is supplied with material that is to be separated.

A further very advantageous embodiment of the invention is present if a dust-removal system with air feed and air discharge is provided, which can be configured to be regulatable.

As a result, very light particles that do not fit into one of the fractions can be suctioned off. The dust load is furthermore reduced.

In this regard, it is extremely advantageous if a filter system is provided, which removes entrained particles when the air is suctioned away.

In this way, this additional fraction can also be separated and removed.

BRIEF DESCRIPTION OF THE DRAWINGS

In the following, the invention will be illustrated using an exemplary embodiment.

In this regard, the figures show.

DETAILED DESCRIPTION OF THE PREFERRED EMBODIMENTS

Figure 1:
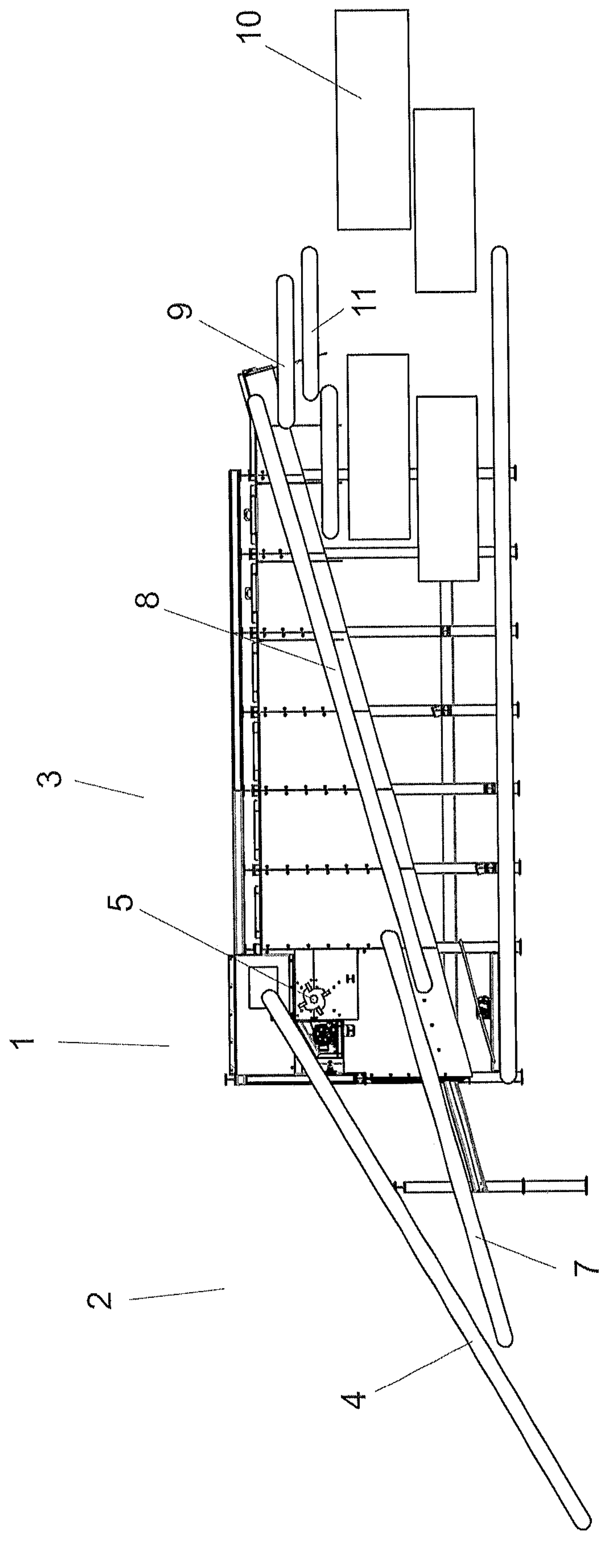
FIG. 1 a schematic representation of an apparatus according to the invention, having a rotating drum and conveyor belts, FIG. 2 a detail representation of the rotating drum, and FIG. 3 a schematic representation of a dust removal system.
Figure 2:
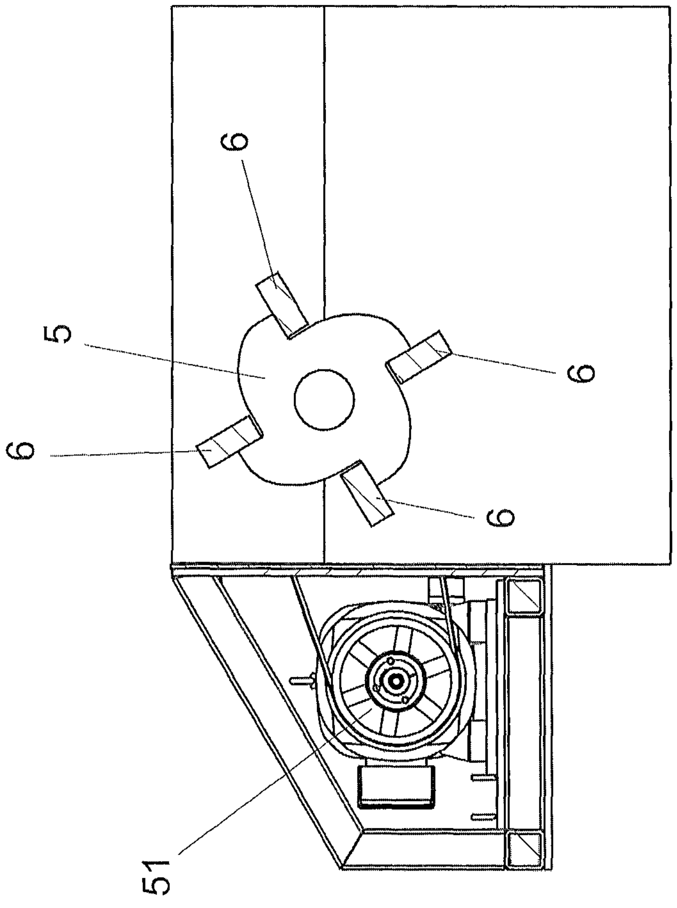

In FIG. 1, 1 refers to an apparatus for comminution, homogenization, and separation of substance mixtures composed of particles. This apparatus 1 has a feed region 2 and a discharge region 3.

A conveyor belt 4 that rises at a slant in the transport direction is disposed in the feed region 2, which belt feeds a substance mixture to be separated to a rotating drum 5.

For this purpose, the conveyor belt 4 ends above the rotating drum 5, so that the substance mixture impacts the drum 5 as it falls down at the end of the conveyor belt 4.

The conveyor belt 4 can be structured to be adjustable with regard to its horizontal and/or vertical position and inclination, thereby making it possible for adaptation to different substance mixtures to take place.

Likewise, the drum 5 is configured to be adjustable with regard to its horizontal and/or vertical position, wherein an adjustment gear mechanism or the like can be provided, thereby making it possible for adjustment to take place even during ongoing operation of the apparatus 1.

Substance mixtures that consist of particles, for example composed of slag, flue ash, shredders, shredded residues, household garbage and commercial garbage, both from shredders and from waste dumps, must be separated into the substances contained in them. For this purpose, they are passed onto the rotating drum 5 by way of the conveyor belt 4 described above. When the particles impact, they are comminuted once again and thereby homogenized. These comminuted and homogenized particles are accelerated in a predetermined direction, into the discharge region 3, by means of the rotating drum 5.

In this regard, each particle is given a corresponding impulse by the drum 5.

In order to ensure a good impulse transfer and also to keep the scatter angle of the accelerated particles small, striking tools 6 are provided on the surface of the drum 5.

In this regard, these striking tools 6 can be configured as transverse ribs, for example. However, large and solid striking tools are also conceivable, which are either rigidly connected with the drum 5 or are mounted in movable manner. Movably mounted striking tools are then set upright by means of the centrifugal force brought about by the drum rotation.

It is practical if the striking tools 6 are configured to be replaceable, so that they can be exchanged when worn. However, it is also conceivable that the striking tools 6 are replaced together with the drum 5.

The size and shape of the striking tools is determined in accordance with the particles to be processed; above all, this is dependent on their mass and size.

If particles having approximately the same size but different mass now impact the rotating drum 5, they are slung away in the direction of the discharge 3 at different distances, and thereby separated from one another.

For this reason, it is particularly important that the particles are comminuted and homogenized by means of the impact of the particles onto the rotating drum 5 or the striking tools 6. The greater the homogeneity of the particle sizes, the better the separation between the fractions.

In this regard, the drum 5 rotates forward, so that the impacting particles are immediately accelerated in the direction of the discharge 3.

By means of this configuration, very tight scattering of the particles between an opening angle of 10° and 15° is achieved.

In this regard, the drum 5 can be driven indirectly, for example by an electric motor 51, which is disposed in the apparatus 1 outside of the sorting space and thereby protected against contamination.

Direct drive is also conceivable.

Since no guide devices are provided, the substance mixture to be sorted can also be sticky, as is usual in the case of many types of waste. In this way, adhesion to and piling up on guide devices is prevented.

Adhesion is also prevented on the drum 5 and on the striking tools 6 by means of the centrifugal forces that occur.

In the discharge region 3, two conveyor belts 7 and 8 are provided in this exemplary embodiment, which belts can be configured to be adjustable with regard to their inclination and horizontal and/or vertical position.

However, collection tubs or other suitable devices, which can also be configured to be adjustable, are also conceivable.

The separated fractions accordingly impact the two conveyor belts 7 and 8 and are transported away by them and either passed along to further treatment or to collection containers.

In this exemplary embodiment, the first conveyor belt 7 transports the particles downward, counter to the throwing direction of the drum 5, whereas the second conveyor belt 8 transports the fraction further in the throwing direction and passes it on to a high-speed conveyor belt 9.

The particles of the fraction are accelerated on this high-speed conveyor belt 9 and separated once again.

In this separation stage, a collection container 10 and a further conveyor belt 11 are now available as a further collection device. Here, too, adjustability with regard to position and, if a conveyor belt is involved, with regard to inclination is also conceivable.

In this exemplary embodiment, the conveyor belt 11 holds the particles having low density. This is what is called the light-weight discharge.

Multiple separation steps are conceivable.

Since usual guide devices and baffle plates are eliminated, even sticky material can be separated. This represents a significant advantage as compared with known systems.

Figure 3:
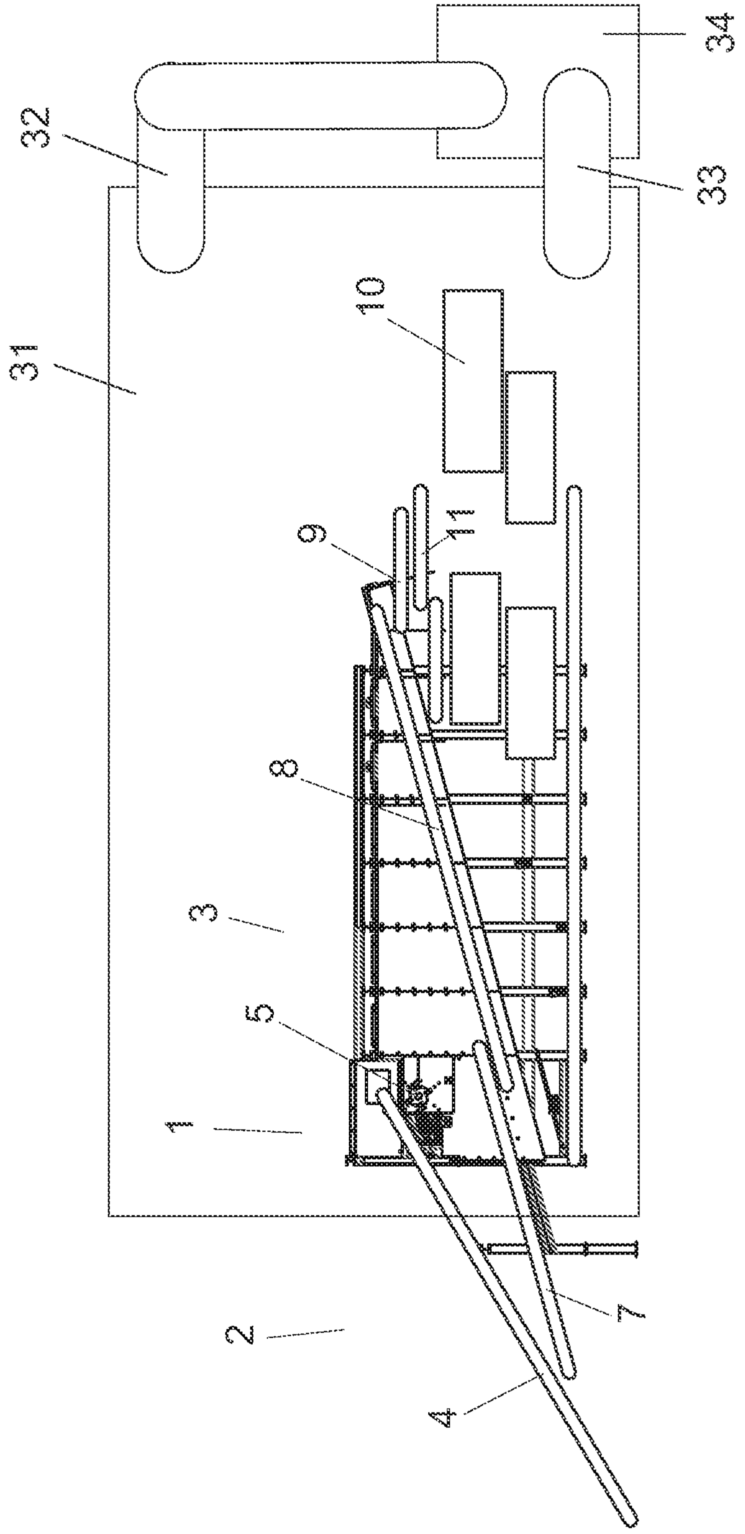

In addition, a dust-removal system having a housing 31 with air discharge 32 shown in FIG. 3 can also be provided, which is able to suction off very light particles. For this purpose, an air feed 33 is disposed in the lower region of the discharge region 3, and an air suction system is disposed in the upper region of the discharge region 3.

The dust-removal system ensures that the separation stages that are formed are not contaminated by lighter particles. These light particles are suctioned off and can be separated by means of a separator or a filter system 34, for example, and then represent a further separation stage.

Conveyor, not shown, or even larger silos and larger collection containers can be provided in order to be able to guarantee at least approximately continuous operation of the apparatus 1.

In total, the separation precision and thereby the sorting quality of the apparatus 1 is very good.

The invention claimed is:

1. An apparatus for homogenization and separation of substance mixtures composed of particles, comprising:

two or more material discharges;

a first separation device comprising a rotating drum; and a second separation device following the first separation device having the drum;

wherein the rotating drum comminutes and homogenizes a substance mixture and accelerates the particles in a predetermined direction to form first and second fractions;

wherein the first fraction is received by the second separation device;

wherein the second separation device comprises a first conveyor belt which accelerates all of the particles in the first fraction in a single direction and separates all of the particles in the first fraction to form third and fourth fractions;

wherein the first conveyor belt is configured to be adjustable with regard to inclination, horizontal position, and/or vertical position, and wherein the rotating drum is equipped with striking tools, wherein these striking tools are connected with the rotating drum in a fixed manner or a movable manner in which the striking tools are put into position by a centrifugal force of the rotating drum.

2. The apparatus according to claim 1, wherein the striking tools are configured to be replaceable.

3. The apparatus according to claim 1, wherein one or more drive motors are provided for the rotating drum, wherein the one or more drive motors are connected with the drum directly or indirectly.

4. The apparatus according to claim 1, wherein the rotating drum is configured so as to be horizontally and/or vertically adjustable.

5. The apparatus according to claim 1, wherein a conveying element is provided, which passes the substance mixture to be separated along to the drum.

6. The apparatus according to claim 5, wherein the conveying element comprises a second conveyor belt configured to be adjustable, at least in relation to the drum, with regard to its inclination.

7. The apparatus according to claim 1, further comprising at least one material collection apparatus configured to be adjustable with regard to inclination, vertical position and/or horizontal position.

8. The apparatus according to claim 7, wherein the at least one material collection apparatus comprises a conveying element configured to be adjustable with regard to inclination, vertical position and/or horizontal position.

9. The apparatus according to claim 8, wherein at least two conveying elements are provided, wherein their conveying directions are oriented to run opposite one another.

10. The apparatus according to claim 1, further comprising at least one discharge device for separated particles comprising a conveying element configured to be adjustable with regard to vertical and/or horizontal position.

11. The apparatus according to claim 6, wherein a material feed is provided, which is configured to be regulatable and applies material to the second conveyor belt.

12. The apparatus according to claim 1, wherein a dust-removal system with air feed and air discharge is provided, which is configured to be regulatable.

13. The apparatus according to claim 12, wherein a filter system is provided, which removes entrained particles when the air is suctioned away.

* * * * *